Nov. 15, 1966  G. H. LOVINS  3,285,124
HIGH PRECISION POINTING INTERFEROMETER
WITH MODIFIED KOSTERS PRISM
Filed Oct. 26, 1964  2 Sheets-Sheet 1

INVENTOR.
GERALD H. LOVINS
BY
Brumbaugh, Free, Graves & Donohue
his ATTORNEYS

United States Patent Office 3,285,124
Patented Nov. 15, 1966

3,285,124
HIGH PRECISION POINTING INTERFEROMETER WITH MODIFIED KOSTERS PRISM
Gerald H. Lovins, Amherst, Mass., assignor to Kollmorgan Corporation, Garden City, N.Y., a corporation of New York
Filed Oct. 26, 1964, Ser. No. 406,974
2 Claims. (Cl. 88—14)

The present application is a continuation-in-part of application Serial No. 208,307, filed July 9, 1962 by Gerald H. Lovins and entitled, "Pointing Interferometer," now abandoned.

This invention relates to interferometers for measuring very small angles and, more particularly, to a new and improved interferometer arranged to measure very small angles with greater convenience and improved accuracy.

Conventional interferometers for measuring small angular displacements are usually adjusted so that a relatively large number of interference fringes of indeterminate order are observed in the field of view and the number of fringes which move past a given point in the eyepiece of the instrument in response to a small angular motion of a reflecting surface is counted to determine the magnitude of the angular motion. This procedure is not only tedious and time consuming but also is subject to error because of the difficulty in determining the edges of the first and last fringes and the possibility of miscounting.

In order to avoid the necessity for counting fringes, various modified interferometers have heretofore been proposed such as the skewed prism and rotatable wedge arrangement described in the Brockway et al. Patent No. 2,880,644, for example, wherein the orientation of the fringes as viewed in the eyepiece changes with angular motion of the reflecting surface and the angle of rotation of an optical wedge necessary to restore the fringes to their original orientation provides a measure of the angular motion of the reflecting surface. Nevertheless, these modified arrangements are subject to the errors normally inherent in any visual interpretation of fringe patterns and, moreover, they require a monochromatic light source of very high purity.

Accordingly, it is an object of the present invention to provide a new and improved interferometer for measuring very small angles which eliminates the above-mentioned shortcomings and disadvantages of present interferometers.

Another object of the invention is to provide an interferometer of the above character having greater sensitivity than present interferometers.

A further object of the invention is to provide an interferometer for measuring very small angles embodied in a compact and relatively inexpensive structure.

These and other objects of the invention are attained by providing a split prism including two right triangular prism members having a light dividing interface wherein a beam of light, which enters perpendicularly to one of the hypotenuse sides of the prism members and intersects the light dividing interface along a selected line extending parallel to all the prism faces and is divided into two beams which strike the hypotenuse sides and are totally reflected so as to emerge as parallel rays from the base surface of the prism members for perpendicular reflection by a remote reflecting surface, has the same path length from the line of intersection to the remote reflecting surface and back to the line of intersection. When the two beams strike the light dividing interface for the second time they are recombined, and with this arrangement the zero order interference condition is present in the field of view of the prism and a white light source can be used. Preferably, the two prism members are cemented together with the planes of the adjacent surfaces intersecting at a very slight angle along a line parallel to all the prism surfaces so that several interference fringes extending parallel to the prism faces including the zero order fringe are visible.

Also, to provide maximum sensitivity, the position of the line of intersection of the incident beam of light with the light dividing interface is chosen to be as close to the base surface of the prism members as will place the emerging parallel rays nearly as far apart as the prism base length will allow. With white light illumination of this prism, only the zero order interference fringe has appreciable brightness contrast with respect to the background and, in order to detect the location of the zero order fringe in the field of view and therefore determine the angle of displacement of the remote reflecting surface with the greatest accuracy, a highly sensitive detecting device such as a dual element photocell is located so that the center of the zero order fringe coincides with the dividing line of the photocell elements when the reflecting surface receives the parallel rays perpendicularly.

In accordance with a preferred embodiment of the invention, a monochromatic light source is combined with a variable intensity white light source to provide an improved positive indication for identifying the zero-order fringe.

Further objects and advantages of the invention will become apparent from a reading of the following description in conjunction with the accompanying drawings, in which.

Figure 1:
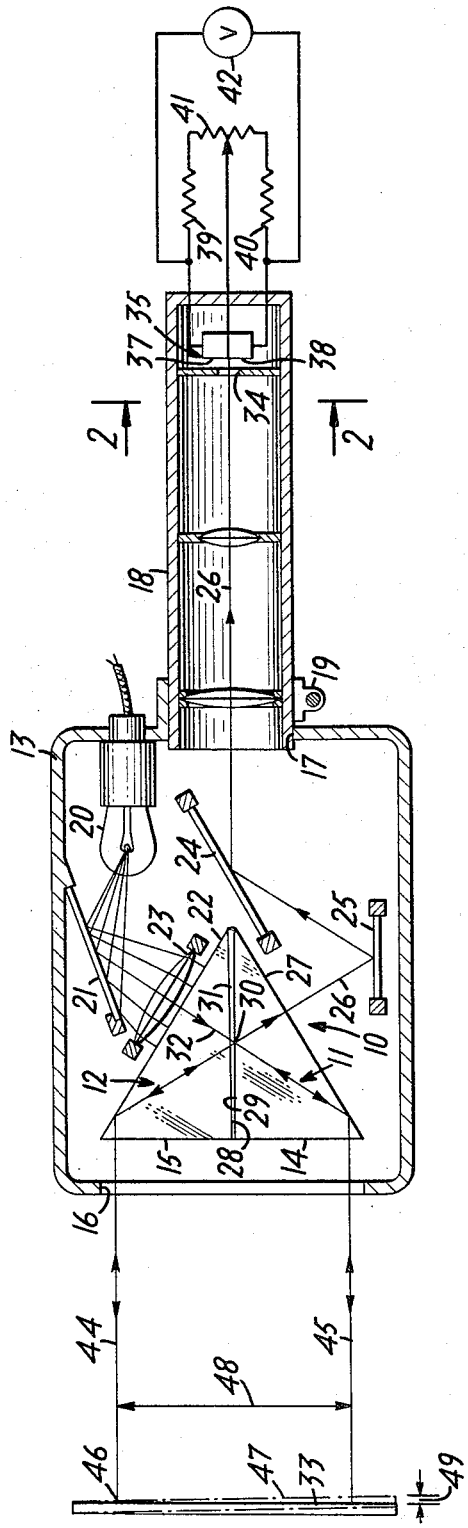
FIG. 1 is a plan view, partly in section, illustrating a representative interference prism arrangement according to the invention.

In the typical interferometer shown in the drawings, a split prism comprising two right triangular prism members 11 and 12 is mounted in a housing 13 with the base surfaces 14 and 15 of the prism members disposed adjacent to an elongated opening 16 in one end of the housing. At its other end, a circular opening 17 is formed in the housing to receive a tubular viewing telescope 18 which may be in the form of a conventional alignment telescope, a clamp 19 attached to the housing being provided adjacent to the opening to hold the telescope in adjustably fixed position. Also mounted in the housing is a white light source 20 which by reflection from a vertical mirror 21 perpendicularly illuminates the hypotenuse or side face 22 of the prism member 12, the light incident on the prism being collimated by a lens 23. If desired, to facilitate adjustment, the light source 20 may be mounted in the top cover (not shown) of the housing 13 vertically above the mirror 21 in which case the mirror is disposed at an appropriate angle to the vertical.

Two further mirrors 24 and 25 are also vertically mounted in the housing 13 and these are located at the proper positions so that a beam 26 leaving the prism after passing through the system is directed by the mirrors 25 and 24 along the telescope axis. A light beam 32, emerging from the lens 23, strikes the hypotenuse face 22 perpendicular thereto and then intersects the light dividing interface 29 along a selected line 30 which extends parallel to all the prism surfaces and is located in the middle portion of the length of the interface. As will be pointed out below, the closer this line of intersection is to the base surfaces 14 and 15 the greater is the sensitivity of the instrument, but for 30°–60°–90° prism members, the line 30 cannot be closer to the base than one-third the length of the interface. Accordingly, the line of intersection 30 should be located in the middle third of the interface and preferably only slightly more than one-third the length of the interface away from the base of the prism.

In order to divide the beam of light from the source 20 at the interface between the prism members 12 and 13 into two beams, one of the adjacent prism surfaces, in the illustrated case, the surface 29, is coated with a thin film of reflective material such as aluminum so that the transmission through the surface is reduced to about 25 to 30 percent, the other surface 28 being uncoated at least over its useful portion. The light dividing material can be any metal or dielectric which will split the light beam into a transmitted and a reflected portion of approximately equal intensity. However, it is best to choose a material which does not have a spectrally selective absorption characteristic. The two prism members 11 and 12 are cemented together with a thin layer 31 (exaggerated in the drawings) of conventional material having substantially the same optical properties as the prisms, such as Canada balsam, and this layer in effect becomes part of the prism 12. During the cementing process, the two prism members are displayed very slightly in the direction perpendicular to the base surfaces 14 and 15 so that the path length of a beam of light 32 which passes through the line 30 and is reflected internally at the surface 27 to as to be reflected perpendicularly from a remote mirror surface 33 is exactly the same from the line 30 to the surface 33 as the corresponding path length of that portion of the beam 32 which is reflected at the line 30 onto the surface 22 and then reflected perpendicularly by the surface 33 and back to the line 30 via another reflection by surface 22. This assures that the zero order interference condition will be presented at the detecting device in the telescope tube 18 when the surface 33 is viewed perpendicularly.

Figure 3:
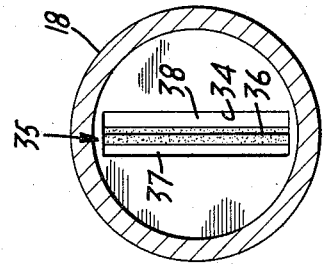
FIG. 3 is a view similar to that of FIG. 2 illustrating the illumination of the detecting device when the reflecting surface has been moved through a very small angle about an axis parallel to the surfaces of the prism.
Figure 2:
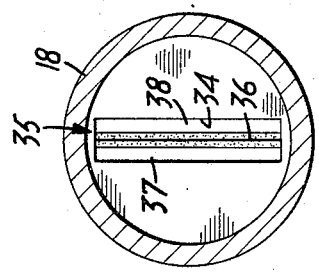
FIG. 2 is a sectional view taken along the lines 2—2 of FIG. 1 and looking in the direction of the arrows showing the manner of illumination of the detecting device by the zero order fringe when the beams from the prism are reflected perpendicularly from the reflecting surface.

In the illustrated embodiment of the invention, the cement layer 31 is tapered slightly along the interface so that the above-described path lengths are not the same at any other point than along the line 30 and, therefore, a well defined zero order fringe of limited width is transmitted along the axis of the telescope tube. Moreover, the zero order fringe which is darker than the background and has substantial contrast with respect thereto because of the complete cancellation of all the wave length components of the white light at the line 30 is projected past a vertical slit aperture 34 onto the sensitive surface of a silicon dual element photovoltaic cell 35 which may be of the type designated TI-LS221, for example. The dividing line 36 between the two sensitive surfaces 37 and 38 of this cell is positioned so that it normally coincides with the center of the zero order fringe as illustrated in FIG. 2. In this condition, the output voltages of the two photocell elements which are applied through two 100,000 ohm resistors 39 and 40 and a 25,000 ohm adjusting resistor 41 are balanced and produce no deflection of a galvanometer 42. If the reflecting surface 33 is turned very slightly, however, the position of the zero order fringe on the photocell shifts laterally, as indicated in FIG. 3, producing a corresponding deflection of the galvanometer. The detecting system may be used as a null indicator or the correlation between galvanometer deflection and angular displacement of the surface 33 may be obtained either by computation or by calibration.

In operation, light from the source 20 enters the surface 22 in parallel rays and the ray 32 is divided at the line 30 by the partially reflecting surface 29 into two rays, one of which passes through that surface to be internally reflected at the surface 27 and the other of which returns to be internally reflected at the surface 22. These two rays then pass in parallel paths 44 and 45 to strike the surface 33 perpendicularly after which they return along the same paths to the line 30. Because the two paths are exactly the same length, all the wave length components of the light in the path which passes through the interface at the line 30 toward the mirror 25 are 180 degrees out of phase with the corresponding components in the other return path which are reflected at that interface toward the mirror 25, there having been one more internal reflection in one of the paths at a boundary with a medium of higher index of refraction. For corresponding pairs of paths of beams perpendicularly reflected from the surface 33 which intersect at any other point along the partially reflecting surface 29, the two path lengths are different and, therefore, cancellation at all wave lengths cannot occur and the second, third and all other order fringes are colored and have relatively little brightness contrast with the background in the field of view. As a result, the photosensitive detector 35 is relatively insensitive to fringes of other than the zero order, while the location of the zero order fringe can be indicated with a very high degree of precision.

If the reflecting surface 33 is pivoted very slightly about the line of reflection 46 of one of the paths to the dotted line position 47, the two path lengths to the line of intersection 30 are no longer equal and complete cancellation does not occur at that line. Instead, it occurs along another line on the surface 29 which is slightly displaced from the line 30 at which the slight difference in thickness of the tapered cement layer 31 compensates for the difference in the external path lengths and this causes the zero order fringe to shift in the field of view, as indicated in FIG. 3, thereby producing a change in the galvanometer reading which is related to the angle of displacement of the surface 33.

Inasmuch as the sensitivity of the instrument depends on the separation 48 of the parallel beams 44 and 45 which are reflected from the mirror, this should be as large as possible and, as pointed out above, maximum separation is accomplished by making the prism so that the line of intersection 30 of equal length paths is spaced from the base surfaces 14 and 15 by a distance close to but slightly greater than one-third the length of the interface. In a typical case, with a total base length of 2 inches, the separation of the beams 44 and 45 may be 50 millimeters, for example. With this arrangement, a displacement 49 of the intersection of the beam 45 with the surface 33 which is equal to one-half the average wave length of the light from the source 20 causes the zero order fringe to move to the original position of the first order fringe in the field of view. This constitutes an angular displacement of the surface 33 of about one second of arc and even with visual observation of the fringes, it is possible to set the zero order fringe in this instrument to one-fiftieth of the spacing between fringes, thereby giving a sensitivity of about 0.02 second of arc. With the dual photocell 35, the sensitivity has been found to be about ten times as great as the visual sensitivity or about 0.002 second of arc.

Although the invention has been described herein with reference to a specific embodiment; many modifications and variations therein will readily occur to those skilled in the art. The photoelectric detector, for example, may be replaced by an eyepiece having a vertical hairline to permit visual observation and setting of the zero order fringe. On the other hand, by making the prism 10 without any taper in the layer 31 so that not only the paths which intersect at the line 30, but all the corresponding pairs of paths through the prism have the same length for perpendicular reflection from the surface 33, the zero order interference condition will cover the entire field of view. In this case, the full visible area changes in brightness as the surface 33 is moved so that a highly sensitive photoelectric detector having a single element covering substantially the entire field of view may be used to detect deviations of the surface 33 from the perpendicular condition.

As indicated above, in the preferred embodiment of the invention a monochromatic light source is supplied in addition to the white light source shown at 20 and the respective outputs are combined (e.g., with a partially transmitting mirror) and directed into the side face 22 of prism 12. When the white light is turned off, the interference fringes appear as black lines on a colored background. With a mercury lamp and a filter which passes the green line (546 nm.), the background will appear green. By using only the monochromatic light source, it is possible to observe and accurately measure orders of interference as high as 3000.

In accordance with a featured aspect of the present invention, the zero order fringe is clearly identified by adding or mixing a controlled amount of white light with the monochromatic light. As the intensity of the white light is increased, all of the interference fringes become slightly colored and then disappear except the zero order fringe which always remains black. This method and apparatus provides an accurate way to determine when the mirror 33 is in the unique position corresponding to the zero order fringe and thus identifies a fixed reference for fringe counting in the measurement of mirror rotation.

In accordance with a further aspect of the present invention, an improved phase shifting means is provided for producing a phase-shifted or displaced interference pattern that is particularly well suited for automatic counting with photo-electric sensors. Two sets of fringes displaced one-quarter fringe apart are produced for viewing by separate photo-sensors through a straight slit aperture which is parallel to both sets of fringes. The resultant output signals from the separate photo-sensors are sinusoidal and displaced 90° in phase. These signals may be supplied to a conventional reversible pulse-counter and phase-sensitive detector to provide an actual indication of net fringe count corresponding to the angular movement of the mirror 33 between two positions even though the motion may have reversed its direction during the movement.

Figure 4:
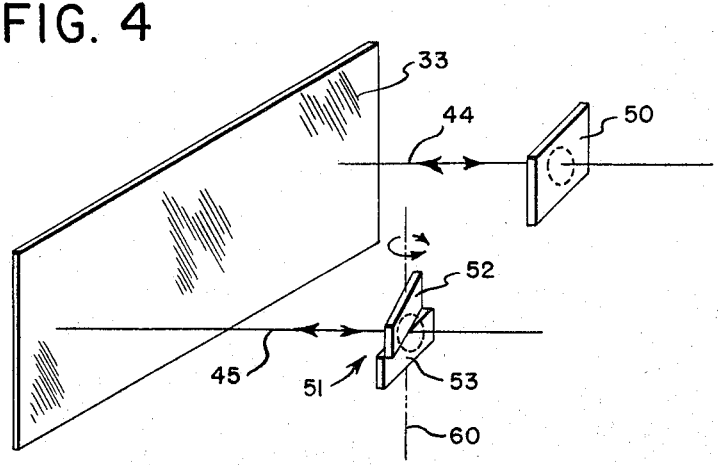
FIG. 4 is a perspective view of a first arrangement of optical elements to effect phase shift of a portion of one of the interferometer light beams.
Figure 6:
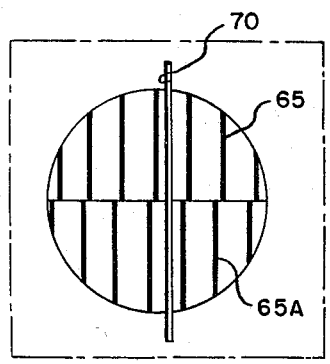
FIG. 6 is a view of the resultant displaced interference fringes produced by the phase shift plates illustrated in FIG. 4.

FIG. 4 illustrates a preferred adjustable phaseplate means for producing two sets of fringes 65 and 65A displaced by one-quarter fringe as shown in FIG. 6. Two glass plates 50 and 51 of identical thickness and material are positioned in a plane perpendicular to and in the paths of the two interferometer beams 44 and 45 and tilted with respect to the prism base as shown. Plate 51 is split into two portions 52 and 53 in a direction parallel to the plane of the beams 44, 45 so as to produce a split field of view. By rotating plate 52 about an axis 60 (which is perpendicular to the plane of the beams) through a selected angle with respect to fixed plate 53, a quarter-wave displacement is imparted to one field portion as shown in FIG. 6. Since the angle between the two plate portions may be varied in a continuous manner, the phase shift between the two field portions may be altered to accommodate the use of any one of a plurality of different wave length monochromatic light sources. Separate photo-sensors (not shown) are provided to view the displaced fringes 65 and 65A respectively through the upper and lower halves of slit 70.

Figure 5:
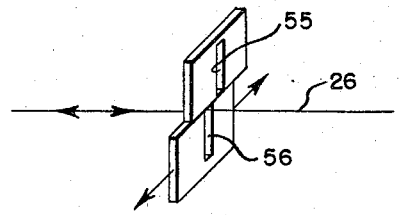
FIG. 5 is a perspective view of an adjustable slit aperture for producing an effective phase shift between the interference fringes viewed by separate photocell detectors.

An alternative means for providing a set of displaced interference fringes for photocell viewing is shown in FIG. 5. Here two relatively displaceable co-planar slits 55 and 56 are substituted for aperture 34 and mounted in the path of beam 26 shown in FIG. 1. Separate photo-sensors (not shown) are mounted behind slits 55 and 56 to view the interference fringes as they pass by the displaced apertures. By adjusting the lateral displacement of the two slits to correspond with one-quarter fringe space, the fringe sets viewed by the separate sensors are effectively shifted 90° and the output signals may be supplied to suitable reversible counters to provide an automatic direction sensitive fringe count. This dual slit phase shifting arrangement is also continuously adjustable to accommodate the use of various monochromatic light sources.

An accurate setting of phase-shift plates 52 and 53 or of slits 55 and 56 may readily be obtained by observing the Lissajou figure produced on an oscilloscope by the output signals from the two photo-sensors.

It will be understood that various changes in the details, materials and arrangement of parts herein described may be made by those skilled in the art within the principle and scope of the invention as defined in the following claims.

What is claimed is:

1. An interferometer for measuring very small angles of displacement of a reflecting element comprising interference prism means having first and second side surfaces inclined at an angle, a base surface, and an internal semireflecting surface positioned so that two light beams which are produced by a beam which enters one side surface and is divided by the semireflecting surface along a selected line extending parallel to all the prism surfaces, and which emerge in parallel rays from the base surface so as to be incident perpendicularly on the reflecting element, have the same effective path length between the selected line of intersection with the semireffecting surface and the reflecting element, thereby producing a zero order fringe of maximum contrast and higher order fringes of reduced contrast with white light illumination, light source means illuminating the prism through the first side surface with parallel rays which pass through the selected line, detecting means for detecting an interference condition positioned to receive light rays from the second side surface which have passed through the selected line, a first glass plate element positioned perpendicular to and in the path of one of the two light beams between the prism and the reflecting element, and a second glass plate element similarly positioned in the path of the other light beam between the prism and the reflecting element, said second glass plate element being divided into two portions in side by side relationship, one of the portions being rotatable about an axis perpendicular to the plane of the two light beams for effectively shifting the phase of fringes presented to the detecting means.

2. An interferometer for measuring very small angles of displacement of a reflecting element comprising interference prism means having first and second side surfaces inclined at an angle, a base surface, and an internal semireflecting surface positioned so that two light beams which are produced by a beam which enters one side surface and is divided by the semireflecting surface along a selected line extending parallel to all the prism surfaces, and which emerge in parallel rays from the base surface so as to be incident perpendicularly on the reflecting element, have the same effective path length between the selected line of intersection with the semireflecting surface and the reflecting element, thereby producing a zero order fringe of maximum contrast and higher order fringes of reduced contrast with white light illumination, light source means illuminating the prism through the first side surface with parallel rays which pass through the selected line, detecting means for detecting an interference condition position to receive light rays from the second side surface which have passed through the selected line, said detecting means comprising a pair of spaced photo-sensors, each of aid sensors being mounted for viewing the interefering light rays from the second side surface through a separate slit, said slits being mounted in coplanar relationship, one of said slits being laterally displaceable with respect to the other in the mounting plane in a direction normal to the length of the fringes in the pattern for effectively shifting the phase of fringes as viewed through the two slits.

References Cited by the Examiner

UNITED STATES PATENTS

| | | | |
|---|---|---|---|
| 2,880,644 | 4/1959 | Brockway et al. | 88—14 |
| 3,035,482 | 5/1962 | Kinder | 88—14 |
| 3,043,182 | 7/1962 | Saunders | 88—14 |
| 3,186,294 | 6/1965 | Woodson | 88—14 |

OTHER REFERENCES

Saunders: "Construction of a Kosters Double-Image Prism," Journal of Research of the National Bureau of Standards, vol. 58, No. 1, January 1957 (Research Paper 2729).

Strong: Concepts of Classical Optics, W. H. Freeman and Co., San Francisco, 1958, pp. 393–399.

JEWELL H. PEDERSEN, *Primary Examiner.*

JOHN K. CORBIN, *Examiner.*